(12) United States Patent
Brill et al.

(10) Patent No.: US 7,051,014 B2
(45) Date of Patent: May 23, 2006

(54) UTILIZING INFORMATION REDUNDANCY TO IMPROVE TEXT SEARCHES

(75) Inventors: Eric D. Brill, Redmond, WA (US); Susan T. Dumais, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 10/464,081

(22) Filed: Jun. 18, 2003

(65) Prior Publication Data

US 2004/0260692 A1   Dec. 23, 2004

(51) Int. Cl.
*G06F 17/30* (2006.01)
(52) U.S. Cl. .............................. 707/2; 707/5
(58) Field of Classification Search ............... 707/2–6, 707/100, 104.1, 203; 715/500, 511, 516
See application file for complete search history.

(56) References Cited

U.S. PATENT DOCUMENTS

| | | | | |
|---|---|---|---|---|
| 6,006,217 | A | 12/1999 | Lumsden | 707/2 |
| 6,028,601 | A * | 2/2000 | Machiraju et al. | 715/705 |
| 6,182,065 | B1 | 1/2001 | Yeomans | 707/3 |
| 6,466,899 | B1 * | 10/2002 | Yano et al. | 704/1 |
| 6,487,553 | B1 | 11/2002 | Emens et al. | 707/5 |
| 6,587,848 | B1 | 7/2003 | Aggarwal et al. | 707/3 |
| 6,601,075 | B1 | 7/2003 | Huang et al. | 707/104.1 |

OTHER PUBLICATIONS

S. Dumais, M. Banko, E. Brill, J. Lin, and A. Ng. Web Question Answering: Is More Always Better? Proceedings of the 25th annual ACM SIGIR Conference, pp. 291-298, 2002.

Mei Kobayashi and Koichi Takeda. Information Retrieval on the Web. ACM Computing Surveys, vol. 32, Issue 2, pp. 144-173, 2000.

A. Arasu, J. Cho, H. Garcia-Molina, A. Paepcke, and S. Raghavan. Searching the Web. ACM Transactions on Internet Technology, vol. 1 Issue 1, pp. 2-43, 2001.

Jonathan Foote, Matthew Cooper, and Unjung Nam. Audio Retrieval by Rythmic Similarity. Proceedings of the 3rd Annual Conference on Music Information Retrieval, IRCAM-Centre Pompidou, 2002. 2 pages.

* cited by examiner

*Primary Examiner*—Luke S. Waussum
*Assistant Examiner*—Cheryl Lewis
(74) *Attorney, Agent, or Firm*—Amin & Turocy, LLP

(57) ABSTRACT

Architecture for improving text searches using information redundancy. A search component is coupled with an analysis component to rerank documents returned in a search according to a redundancy values. Each returned document is used to develop a corresponding word probability distribution that is further used to rerank the returned documents according to the associated redundancy values. In another aspect thereof, the query component is coupled with a projection component to project answer redundancy from one document search to another. This includes obtaining the benefit of considerable answer redundancy from a second data source by projecting the success of the search of the second data source against a first data source.

61 Claims, 8 Drawing Sheets

UTILIZING INFORMATION REDUNDANCY TO IMPROVE TEXT SEARCHES

CROSS-REFERENCE TO RELATED APPLICATIONS

This application is related to pending U.S. patent application Ser. No. 10/460,955; and entitled "ARCHITECTURE FOR GENERATING RESPONSES TO SEARCH ENGINE QUERIES" filed on Jun. 13, 2003.

TECHNICAL FIELD

This invention relates to data searching, and more specifically, to using repetitive search results to further return the desired information.

BACKGROUND OF THE INVENTION

When a user types a query to a search engine, he or she often receives multiple documents (or "hits") that satisfy or partially satisfy the query. This is referred to herein as information redundancy. For example, if the user queries the Internet for "Abraham Lincoln," they will often get a large number of documents and a great deal of content overlap. Data may be returned unrelated to the requested information; for example, some pages might have nothing to do with the president. There may be a passage ". . . my cat, whose name is Abraham Lincoln . . . " and a theme park called the ". . . the Abraham Lincoln Theme Park" or a website selling "Abraham Lincoln memorabilia," and so forth. This content overlap is called information redundancy. Generally, information redundancy is annoying and time consuming to the user, since the user may need to read the same information multiple times in multiple different documents. Once the user finds a particular piece of information in one document, time should not be wasted reviewing the same information in many other documents.

What is needed to overcome the shortcomings in the prior art is to provide a more efficient means for providing search results to a user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, provides an architecture that can be employed to improve a search experience by using information redundancy as a manner to generally characterize documents on a particular topic. For example, information content for a document can be expressed according to a similarity value—the more similar information content of a document in a return set is to other documents in the return set (e.g., a set of documents returned by a search engine for the query "Abraham Lincoln"), the more likely the document is to be a good document for a particular query. Thus if, for example, there are one hundred returned documents ten of which are truly about Abraham Lincoln, and ninety of which are documents that just randomly mention Abraham Lincoln, each of the ninety less relevant documents will have a low information redundancy value with respect to other returned documents, whereas the ten on-topic return documents will have high information redundancy value, as least with respect to the other relevant documents.

In furtherance thereof, the present invention provides a framework for processing content search results by describing a number of specific ways searches can be improved by capitalizing upon information redundancy. The invention accomplishes this by identifying/filtering repetitive documents and identifying/filtering off-topic information.

In one aspect thereof, word probability distribution redundancy information is utilized from a single set of document results to identify more on-topic documents and reduce the number of repetitive documents. That is, when search results are returned, a word probability distribution is calculated for each document result of the returned document set. An information redundancy value is calculated individually for each result. The information redundancy value can be measured between two documents as defined by a cosine distance between word probability distributions for the two pages. The higher the average pairwise information redundancy between a particular document and the other returned documents, the better the overall redundancy value is for that particular document. This information is then used to rerank the documents returned by the search engine for the query, such that an output of the query is a reranked list of the returned documents.

In another aspect, the invention "projects" success of a search of a second search engine onto a search process of a first search engine to improve success of the first search engine. In this scenario, a second result set having a high information redundancy value is used as a basis for improving search results of a first dataset that has a low information redundancy value. When a user submits the query to a search engine of a low redundancy dataset, the query is automatically presented to a second search engine for processing against a high redundancy dataset. The low redundancy dataset places more stringent searching knowledge on the user since document redundancy therein is very low. Thus without the second search engine, the user may receive few, if any at all, returned documents from the first search engine.

The invention utilizes word probability distribution redundancy information between sets of returned document results to improve accuracy of a content search. For returned documents from a first dataset, a word probability distribution is calculated for each individual document. However, instead of evaluating documents returned by the first dataset for average pairwise information redundancy with other documents returned by first dataset, documents returned by the second dataset are evaluated for an average pair-wise information redundancy with a set of documents returned by the first dataset. Intuitively, the search on the second dataset is used to characterize likely properties of a good answer page, and then further using this information as a way to improve the search over the first dataset. This information is employed to re-rank the documents returned by the search engine for the query, such that an output of the query is a reranked list.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may

DETAILED DESCRIPTION OF THE INVENTION

Figure 1:
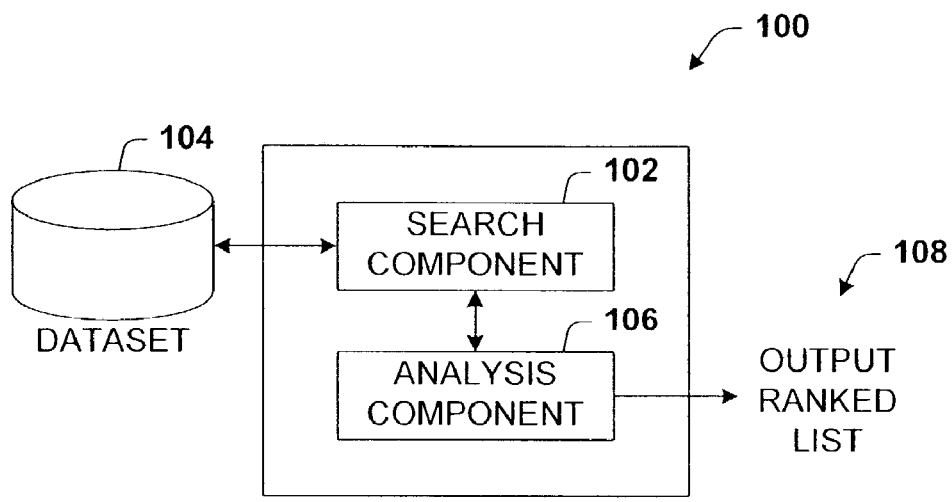
FIG. 1 illustrates a block diagram of a search and analysis system for providing improved search results in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a search and analysis system 100 for providing improved search results in accordance with the present invention. The system 100 includes a search component 102 for searching a dataset 104. The search component 102 receives a query (or search request) from any of a number of different sources, for example, a browser program, a local program application of the system for searching common application files, and a remote application for searching a local database. A query is a string of one or more terms characterising a user's information need. Documents are also characterised by key-terms (selected from within the document). The search component 102 processes the search request against the dataset 104 to return one or more result(s). In the context of searching on the Internet, or a network that provides a large resource of documents either distributed or in a single location, the result may be a number of web pages of information, the content of which is associated with the search terms. In a database, the results may be tables of information each of which is associated with the search terms. In an application, for example, a word processing application, the search results may be a number of application documents the contents of which are associated with the search terms.

The system 100 also includes an analysis component 106 for processing the search results by identifying/filtering repetitive (or redundant) documents (or data, generally), and identifying/filtering off-topic information. Although redundant documents or results pose annoyances to the user and can reduce productivity, such redundancy may be used to an advantage as a way to generally characterize documents according to a particular topic. For example, if a query is sent to a search engine that returns one hundred documents, the information content of a page can be represented simplistically by a word probability distribution for that page. The word probability distribution ranks the words that appear on the document, and with what frequency. The word probability distribution can be derived individually for each of the one hundred documents. Next, an information redundancy value of a document can be measured as the average pairwise information redundancy between any one document (or subset of documents) and the other individual documents in the return set.

The information redundancy value can be measured between two documents as defined by the cosine distance between the word probability distributions for the two pages. In order to do this, the word probability distributions are converted to vectors of word frequencies and occurrences. The cosine distance metric is commonly used to measure the similarity of text documents, and computes the difference in direction, irrespective of vector lengths, where the distance is given by the angle between the two vectors. The cosine of the angle between two vectors is equal to their correlation coefficient. The higher the average pairwise information redundancy between a document and the other return documents, the better the redundancy value of that document with the document set. This information is then used to rerank the documents returned by the search engine for the query, such that the output of the query is a reranked list 108.

Note that the query component 102 and the analysis component 106 may be configured as separate devices distributed local to one another or across a network, but operating cooperatively with one another to provide the desired output 108.

Figure 2:
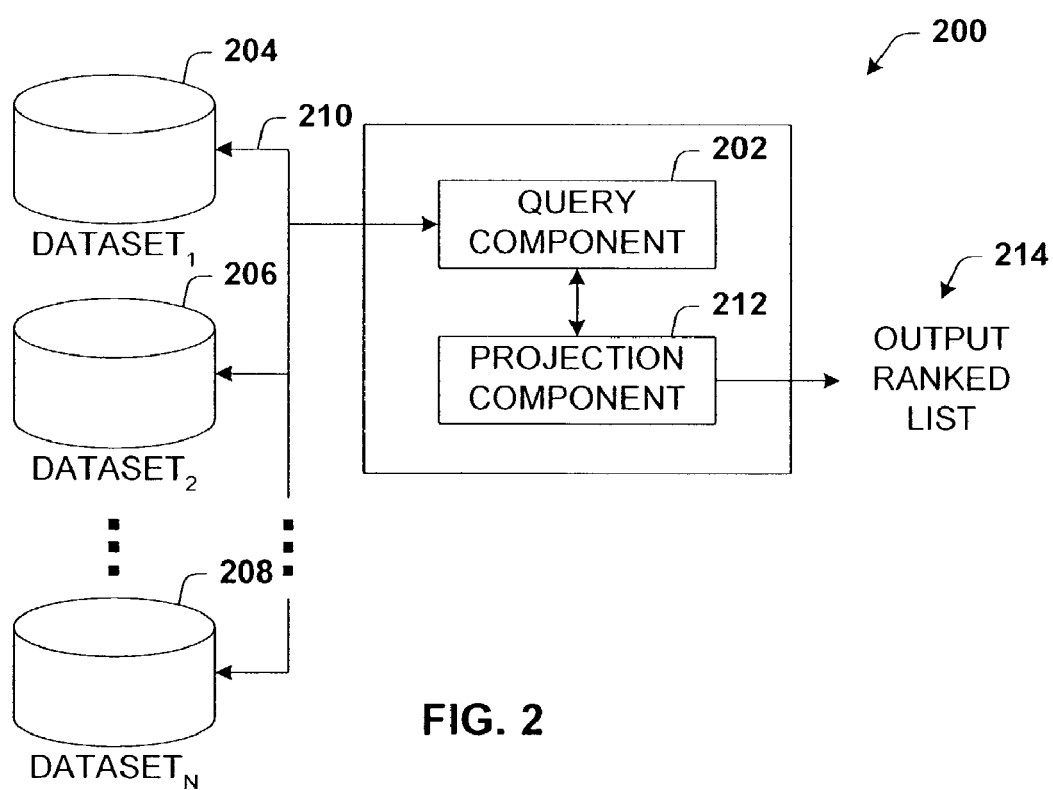
FIG. 2 illustrates a block diagram of a query and projection system for providing improved search results between two searches, in accordance with the present invention.

Referring now to FIG. 2, there is illustrated a block diagram of a query and projection system 200 for providing improved search results between two searches, in accordance with the present invention. A slight variation of the configuration of FIG. 1 allows answer redundancy to be projected from one returned document collection to another. In furtherance thereof, there is provided the system 200 that comprises a query component 202 (similar to the search component 102) for processing one or more query requests. The query component 202 interfaces with a plurality of datasets, $Dataset_1$, $Dataset_2$, . . . ,$Dataset_N$. Thus the query component 202 can apply a single query to all of the datasets (204, 206, and 208), multiple queries to all of the datasets (204, 206, and 208), or different queries to some, and not to other datasets (204, 206, and 208). The query component 202 interfaces to the datasets (204, 206, and 208) via a communication medium 210, which medium may be a wired and/or wireless network (e.g., a LAN, WAN, WWAN, or the Internet), internal data bus, or any other conventional architecture for communicating signals between devices.

The system 200 further includes a projection component 212 that receives the results of a query from the query component 202, and processes the first set of results to determine if projection is required. If so, the projection component 212 uses the search terms to perform another search with a second search engine of a more redundant dataset of documents.

The second query will likely be required when the first search was performed on a low redundancy dataset, such that the user is required to have some knowledge of the technology to provide an "intelligent" search of the low redundancy dataset. Otherwise, the search results will return few, if any documents at all, frustrating the search attempts of the user. One example of a low redundancy dataset includes a technical support database where management thereof ensures that the technical resource data size is as refined as possible to maintain a small data footprint, inferring very low redundancy in the content. Another low redundancy dataset may be packaged with a software application or program such that when the user performs a search about features of the program, the dataset is accessed. Again, management thereof ensures that the size of the program dataset is as refined as possible to maintain a small data footprint, inferring very low redundancy in the content. Other such datasets exist in abundance, as is appreciated by one skilled in the art.

Once obtained, the query results of the second search engine are applied against the results of the first search results to obtain a reranked output list 214. More specifically, the system 200 allows the user to benefit from the second dataset 206 where there is considerable answer redundancy, to improve searching over the first dataset 204 selected for projection, which has little or no answer redundancy. When the user submits the query, the query is processed in at least one of two ways: the same query may be presented substantially simultaneously to two different search engines at the same time (of the low redundancy dataset and the higher redundancy dataset), or sequentially, to the first search engine to first determine of the first search was successful, and if not, to the second search engine to then improve the results of the first search by projection. For the returned documents from the first dataset 204, the word probability distribution is calculated for each individual document. However, instead of evaluating documents returned by the first dataset 204 for average pairwise information redundancy with other documents returned by first dataset 204, documents returned by the second dataset 206 are evaluated for the average pairwise information redundancy with the set of documents returned by the first dataset 204. Intuitively, the search on the second dataset 206 is used to characterize likely properties of a good answer page, and then further using this information as a way to improve the search over the first dataset 204. This information is then used to rerank the documents returned by the search engine for the query, such that the output of the query is a reranked list.

Note that the systems of FIG. 1 and FIG. 2 may also be consolidated such that the single system includes both the analysis and projection components (106 and 212), in addition to the search (or query component 202) component 102. Still further, the analysis component 106 and the projection component 212 may be consolidated into one component that performs both functions. Further, the query component 202 and the projection component 212 may be configured as separate devices distributed local to one another or across a network, but operating cooperatively with one another to provide the desired output 214.

Figure 3:
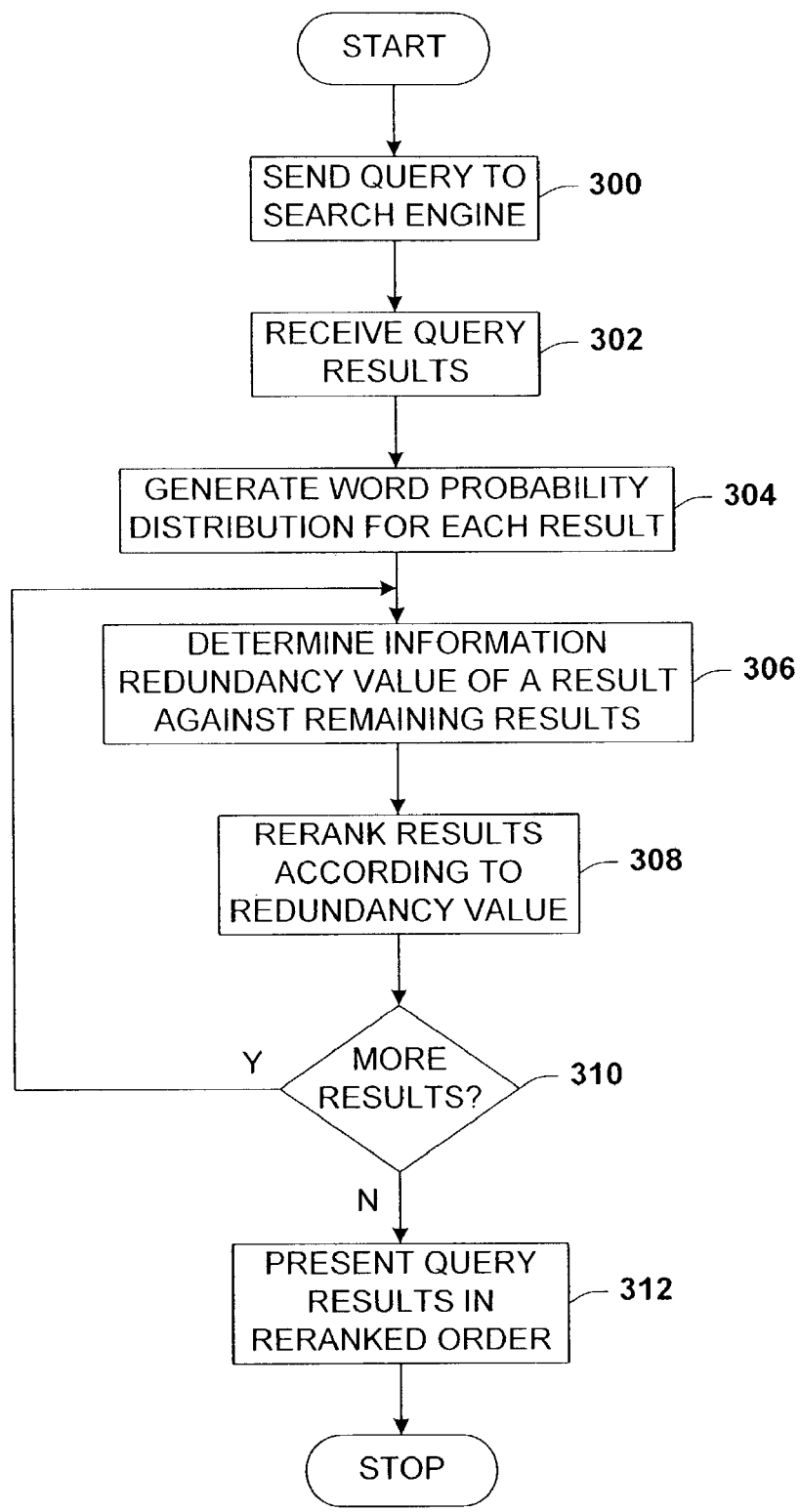
FIG. 3 illustrates a flow chart for the process of information redundancy according to FIG. 1.

Referring now to FIG. 3, there is illustrated a flow chart for the process of information redundancy according to FIG. 1. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Flow begins at 300 where a search query is sent to a search engine. At 302, the search results are returned. At 304, a word probability distribution is generated for each result (or document, for example) of the returned results. At 306, an information redundancy value of a result is determined from the remaining results. As indicated previously, this is determined as the cosine distance between the word probability distributions of two results. At 308, the output results are reranked according to the redundancy value of the result. Of course, this may be performed differently by saving all of the redundancy values of the results, and then performing the reranking of the output list in a single process. At 310, the system determines if another result needs to be processed. If YES, flow is back to the input of 306 to continue the process. If NO, flow is from 310 to 312 to present the output results in a reranked order. The process then reaches a Stop block.

Figure 4:
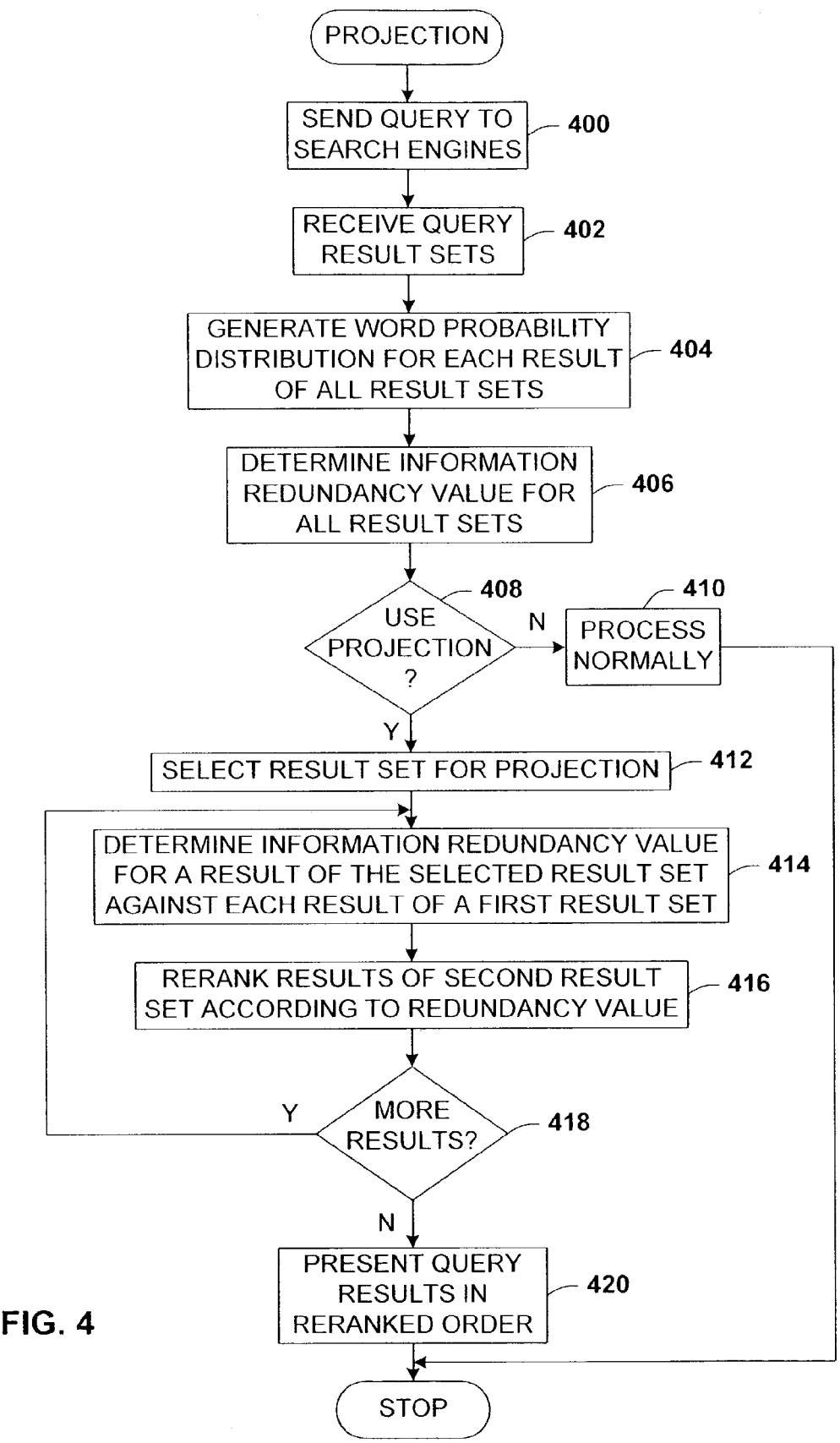
FIG. 4 illustrates a flow chart for the process associated with the query and projection system of FIG. 2.

Referring now to FIG. 4, there is illustrated a flow chart for the process associated with the query and projection system of FIG. 2. Flow starts at 400 where a query is sent to multiple search engines associated with respective datasets. At 402, the search results are returned. At 404, word probability distributions are generated for each result in all of the result sets. This is in preparation for the system determining whether projection is required for any of the returned results. At 406, information redundancy values are determined for all result sets. At 408, the system determines if projection is required for any result set. If NO, flow is to 410 to process the result sets normally, as in FIG. 1. If YES, flow continues to 412 to select a result set meeting the criteria for projection. At 414, an information redundancy value is determined for each result of the selected result set, as applied against each result of the first result set. If more results need to be processed for an information redundancy value, flow is from 418 back to the input of 414 to select the next result. IF NO, flow is from 418 to 420 to present the query results in a reranked order. The process then reaches a Stop block.

The disclosed architecture has application in a number of environments. For example, information redundancy across search documents can be used as a way to improve text searches. Additionally, information redundancy can be projected across domains, which has many uses. For example, one could use newsgroup posts to improve web searches by finding the information redundancy for a query in newsgroups and then projecting this information over to web searches to improve web search results. Likewise, web information can be used to improve searches over vendor-authored help and support documents. This would allow a vendor to greatly improve search over vendor-owned content.

Figure 5A:
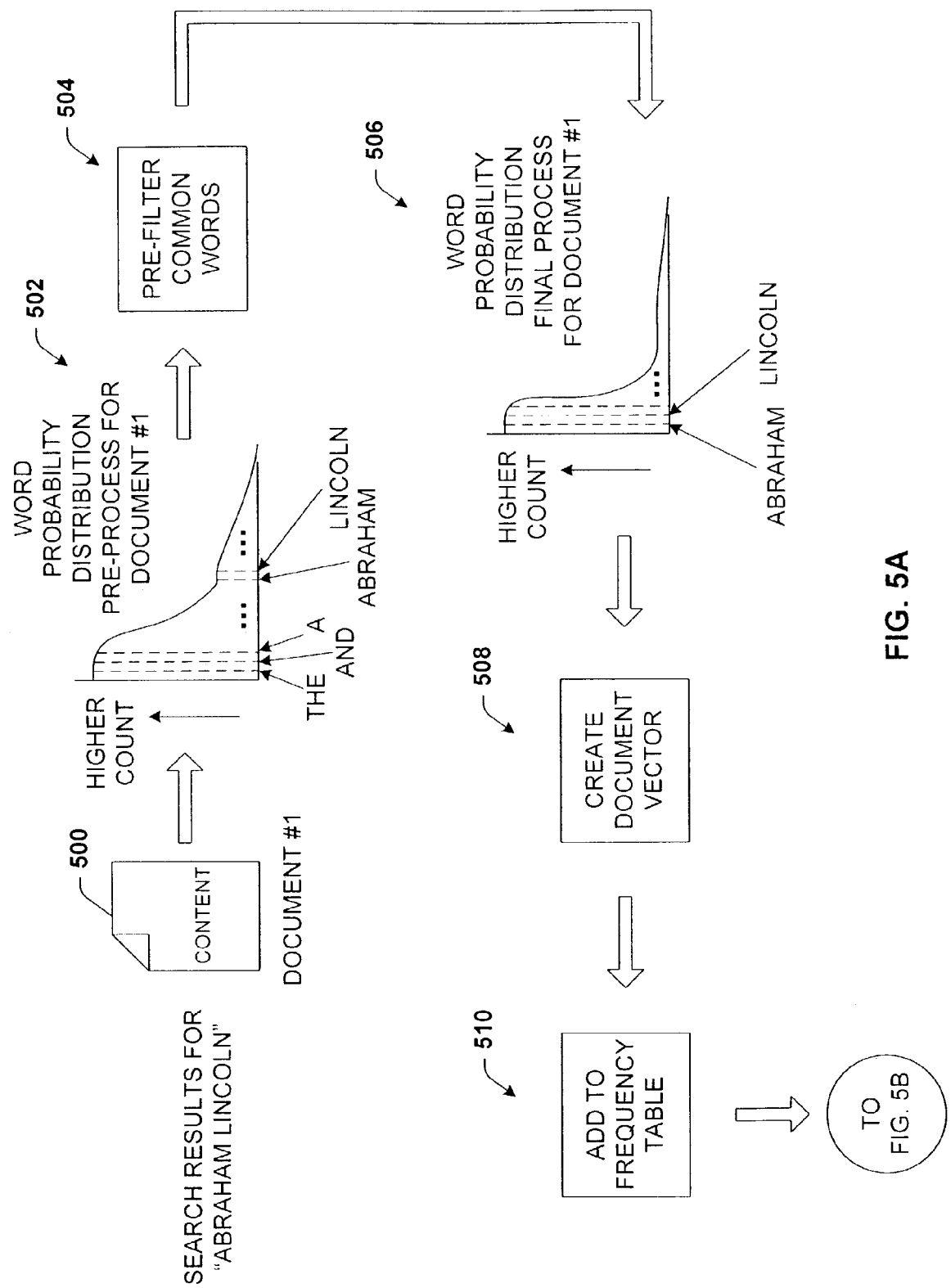
FIG. 5A and FIG. 5B illustrate a flow diagram of the process for determining document ranking according to the present invention.
Figure 5B:
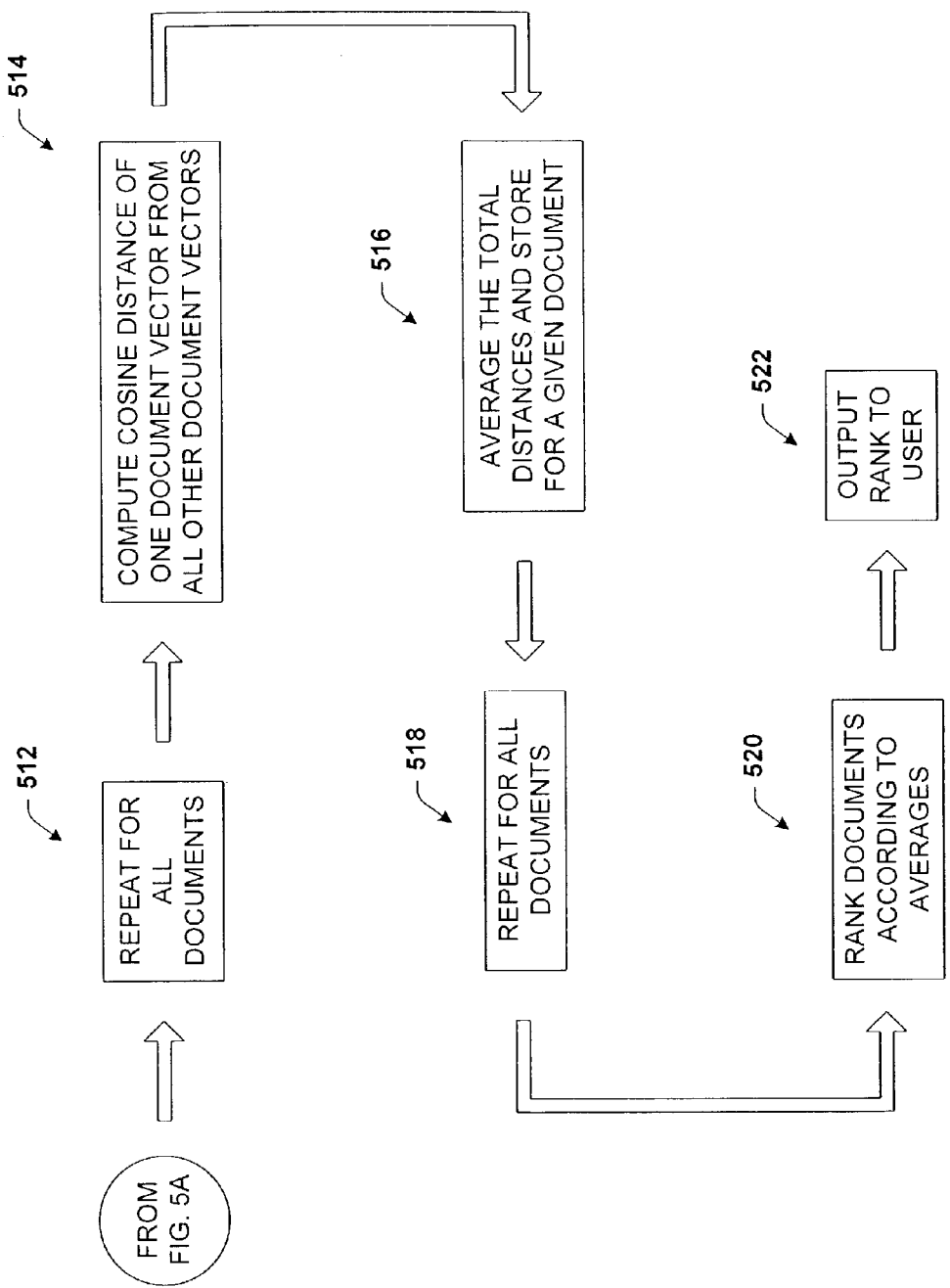

FIG. 5A and FIG. 5B illustrate a flow diagram of the process for determining document ranking according to the present invention. Referring now to FIG. 5A, a text document 500 is being processed, which document 500 was returned according to a query that includes key words in the content of the document. In this example, the query is for the terms "Abraham Lincoln." The system begins by processing the content of the document 500 into a word probability distribution. At 502, word probability distribution pre-processing is performed to determine the type and frequency of the words in the text document, which includes the search terms. Here, it can be seen that the text document includes a number of words that are irrelevant to the search, yet high in number compared to the search terms "Abraham" and "Lincoln". These irrelevant words typically include the articles and connectors (e.g., a, and, the, or). Thus, these words may be ignored or filtered out for subsequent processing. At 504, a pre-filter removes these common irrelevant words. At 506, a revised word probability distribution is generated for the document 502 illustrating that the search terms are high in the distribution.

In text information retrieval systems, a Boolean model or a vector space model may be used to satisfy the search process. The Boolean process can lead to too few or too many documents being retrieved, and imposes a skill on the user to submit "intelligent" queries. In the vector space model, a query is represented by an M-place vector that represents each text document, where each element is the frequency of one key word in the text. A fixed set of keywords (or search terms) is used to index all of the documents. A frequency table is generated, which table is an M×N matrix, where M is the number of terms, and N is the number of documents in a collection. Semantic similarity is determined by spatial proximity of the query vector and the document vector. The cosine distance is used to determine the angle between the query vector and the document vector (irrespective of vector magnitude), which relates to the correlation (or similarity) coefficients. Similarity coefficients measure spatial proximity, and therefore determine the ranking of the text documents for a given query.

Thus in operation, at 508, the word probability distribution is converted into a document vector. At 510, the document vector is inserted into the frequency table for later processing.

Continuing with FIG. 5B, a document vector is created for each returned document, as indicated at 512. At 514, a cosine distance is determined for each document against the remaining documents. This is the pairwise information redundancy value for the given document against all remaining documents.

At 516, the distances for a given document are averaged and stored. This is the average pairwise information redundancy value for that document. The process is repeated for each returned document, as indicated at 518. At 520, the documents are ranked according to the average redundancy value, or this could be used as one feature in a ranking algorithm. At 522, the ranked documents are output to the user.

Figure 6:
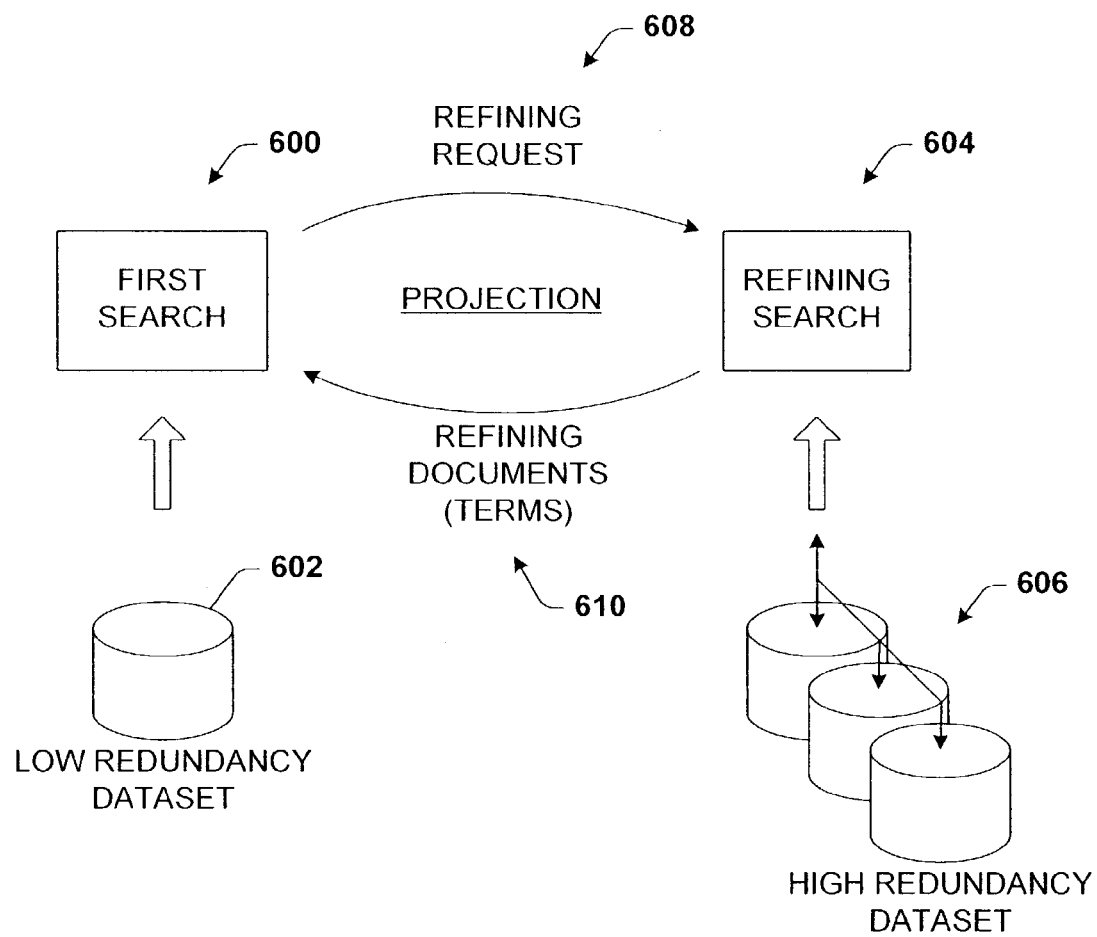
FIG. 6 illustrates a block diagram of the projection process in accordance with the present invention.

Referring now to FIG. 6, there is illustrated a block diagram of the projection process in accordance with the present invention. Projection processing finds utilization in a wide variety applications. In one illustrated embodiment, there is provided a first (or low redundancy) system 600 having associated therewith a first (or low redundancy) dataset 602 that a user wishes to search. The low redundancy dataset 602 is a less redundant dataset such that when a typical user creates a search query, the probability of getting the desired result is low. This is because the low redundancy dataset 602 is well structured and organized to reduce redundancy, and is highly refined to cover only specific topics. The low redundancy dataset 602 includes such examples as a technical support database where the content is limited to specific terms and usage, and limited databases provided with programs that the user might purchase. Technical databases are now becoming more accessible to the average user due to the availability of such data sources on the Internet. Similarly, the proliferation of software programs or applications that provide a limited knowledge or support database are now becoming more affordable and desirable to a more technically oriented consumer base. However, each of these pose similar challenges to the user in that the user may be forced to know the search terms associated with these more restrictive databases, may know the term needed but the database lacks the depth to address the issue, or otherwise face very limited search results, if any at all.

The disclosed projection architecture overcomes these limitations by utilizing at least a second (or high redundancy) system 604 (or refining search system) from which to assist the user (via capabilities of the low redundancy system 600) in determining the search terms for use against the low redundancy dataset 602. Note that the use of the relative terms "low" and "high" are intended to mean that the low redundancy dataset simply has document redundancy that is less than that of the high redundancy dataset. In operation, when the user of the low redundancy system 600 receives a search request for processing against the low redundancy dataset 602, the same search request is automatically sent to the high redundancy system 604 (also designated herein as a "refining request" 608).

Note that automatic forwarding of the search query to the high redundancy system 604 may be performed free of any criteria dependency or according to a number of criteria. For example, the low redundancy system 600 may first be required to determine that the search results thereof fail to meet a minimum document results criteria, after which the query is then forwarded to the high redundancy system for processing. Another example includes automatically forwarding the query to the high redundancy system 604 based upon the type of search, and content request from the search. If the query involves financial information, or time sensitive information, these criteria may require automatic forwarding to the high redundancy system 604 or even a plurality of high redundancy systems. Still another example includes only forwarding the query based upon the time required to conduct the low redundancy search. That is, if the low redundancy search exceeds a predetermined time limit, the query is forwarded to the high redundancy system 604 for processing. In yet another example, if the user interacts with the low redundancy document results in a way that indicates to the system the high redundancy search is not required, the query is either not forwarded, or if already forwarded, is cancelled. It should be appreciated that numerous other variations may be employed to optimize the search process in accordance with the present invention.

The high redundancy system 604 has associated therewith a high redundancy dataset 606, which dataset 606 is typically, although not required to be, much larger, and from which the search will likely draw a much larger number of redundant search results. (Note that use of the term "redundant" herein, is intended to include both redundant and substantially redundant documents). The high redundancy system 604, in this particular embodiment, may be the Internet, which includes a vast number of high redundancy database resources in the form of, e.g., websites providing web pages (or documents) from which to retrieve information. The high redundancy system 604 may also include, but is not limited to, a corporate data network having many corporate databases of information disposed thereon for access by its employees, and even reduced access to inside and outside users. Thus the high redundancy dataset 606 is a more redundant dataset of documents that may even be stored in duplicate across many disparate sources, or the content of which is highly redundant to a certain degree which can be calculated to aid the search of the low redundancy dataset 602. In any case, it is appreciated that when a user performs a search, whether it is on the Internet or corporate network, the number of documents returned for review can be enormous, and enormously redundant.

This high redundancy offered by the dataset 606, which typically may be counterproductive in a conventional searching sense, may be used to an advantage, as indicated hereinabove, by applying probability distribution principles to further aid the user in searching the low redundancy dataset 602. The search engine of the high redundancy system 604 will return a much larger result set of documents for pairwise comparison with document results of the low redundancy dataset 602.

Thus, in response to receiving the refining request 608, the high redundancy system 604 searches and returns to the low redundancy system 600 a set of redundant documents (also designated "refining" documents 610) for pairwise processing against the document search results obtained from the search of the low redundancy system 600. That is, each document returned by the low redundant system 600 is processed against the high redundancy set of documents. This facilitates determining which of the low redundancy search documents have some measure of relevance to the initial search of the low redundancy dataset 602. Once the pairwise process is completed, the low redundancy documents are reranked and output to the user.

The subject invention (e.g., in connection with determining the number of returned documents to select) can employ various artificial intelligence based schemes for carrying out various aspects of the subject invention. For example, a process for determining how many documents are to be selected for the word probability distribution process can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which or how many documents to choose for processing. The criteria can include, but is not limited to, the number of returned documents, the type and/or importance of the search terms, the time that search was requested by the user, the properties of documents selected for review by the user, the properties of documents not selected for review by the user, etc. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence (class). In the case of document or text based data storage systems, for example, attributes are words, images, phrases or other data-specific attributes derived from the content, words (e.g., parts of speech, presence of key terms), and the classes are categories or areas of interest (e.g., levels of priorities).

Thus, in accordance with numerous alternative embodiments of the present invention, the projection architecture analyzes properties of the document results the high redundancy result set to generate refining terms 610 therefrom. This analysis process may include using classifiers or selection algorithms operating in accordance with any number of criteria for making document selection, including, but not limited to, selecting the first one hundred documents, selecting documents based upon the success of the returned document including more than one of the search terms, selecting documents based upon the inclusion of at least two key search terms of multiple search terms, including a string of search terms in the required sequence, including the search terms within a required spatial parameter (e.g., term2 must be within three words of term1), selecting documents based upon properties of image content and audio contained therein, and selecting documents based upon the number and/or type of hyperlinks to other websites. It is appreciated that where two documents are highly (or are) redundant, this may exclude use thereof since the documents may be duplicates. Thus the projection architecture may be suitably configured to provide upper and lower redundancy limits to exclude documents that are excessively redundant or have low redundancy according to predetermined criteria.

More specifically, one robust alternative implementation includes obtaining a subset of the documents from the high redundancy set, which subset is a ranked set for use in pairwise processing against the low redundancy results.

In another alternative embodiment, pairwise processing may be used exclusively on the high redundancy set of returned documents, which ranked results are projected against the low redundancy set.

In still another alternative embodiment of the present invention, pairwise processing is used exclusively on the low redundancy result set to obtain a ranked low redundancy set of documents, against which the high redundancy results are projected.

In yet another alternative embodiment, informative terms generated from the search query, may be utilized separately or on conjunction with a question hierarchy to enhance the prospects of getting more relevant results from either or both of the low and high redundancy system searches. The search results here may include either (or both) documents as results or (and) text as results.

In another aspect thereof, the refining terms 610 may be used to automatically initiate a second search on the first system 600, from which a reranked set of document results is provided to the user.

In yet other alternative implementations thereof, various combinations of the above embodiments may be utilized. For example, the ranked set of results from the high redundancy set is projected against the ranked set of low redundancy document results; the ranked high redundancy result set is projected against the total low redundancy document result set, and so on.

Note that conventional similarity measures other than the cosine distance may be used to determine the similarity of documents, e.g., a Jaccard coefficient measure, weighted Jaccard coefficient measure, and weighted mutual information measure.

The first search system 600 and the second search system 604 may be a single system such that when the user initiates a search via the first system 600, which may be a software program with a limited database resource, the software program is controlled to automatically communicate with a network communication program (e.g., a browser) to initiate the same search with a search engine over a more widely distributed data network, e.g., the Internet. This would be transparent to the user. All the user would see is the reranked results or some message indicating the success or failure of the search.

Alternatively, the second system 604 could be designed as part of the computer operation system, and the first system 600 is included with any of the software programs installed on the computer system. Upon installation of a software program, the appropriate software hooks are made to engage the two systems (600 and 604) to facilitate the searching process for the installed software program.

Additionally, the search engine of the second system 604 may further enable searching via one or more remote search engines of other systems (not shown) to facilitate the document processing capabilities of the present invention. A probabilistic process could then be used to determine which documents across the several remote search systems will be returned to the second system 604 for ultimate processing against the first system 600.

Figure 7:
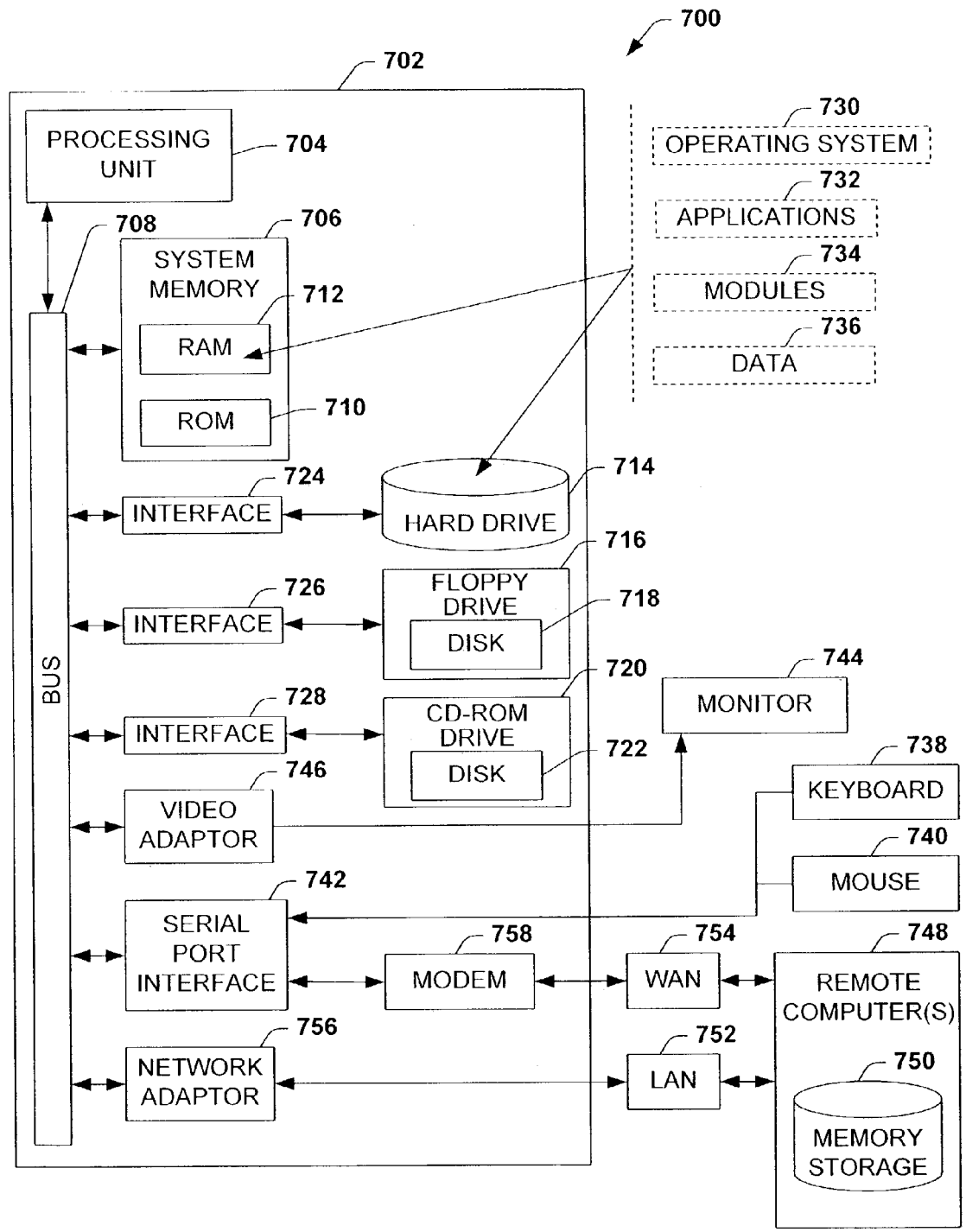
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, there is illustrated an exemplary environment 700 for implementing various aspects of the invention includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multiprocessor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other high capacity optical media such as Digital Video Disk (DVD)). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734, and program data 736. It is to be appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device also connects to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in offices, enterprise-wide computer networks, intranets and the Internet.

When used in a LAN networking environment, the computer 702 connects to the local network 752 through a wired or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 typically includes a modem 758, or is connected to a communications server on the LAN, or has other means for establishing communications over the WAN 754, such as the Internet. The modem 758, which may be internal or external and a wired or wireless device, connects to the system bus 708 via the serial port interface 742. In a networked environment, program modules depicted relative to the computer 702, or portions thereof, may be stored in the remote memory storage device 750. It will be appreciated that the network connections shown are exemplary and other means of establishing a communications link between the computers may be used.

Figure 8:
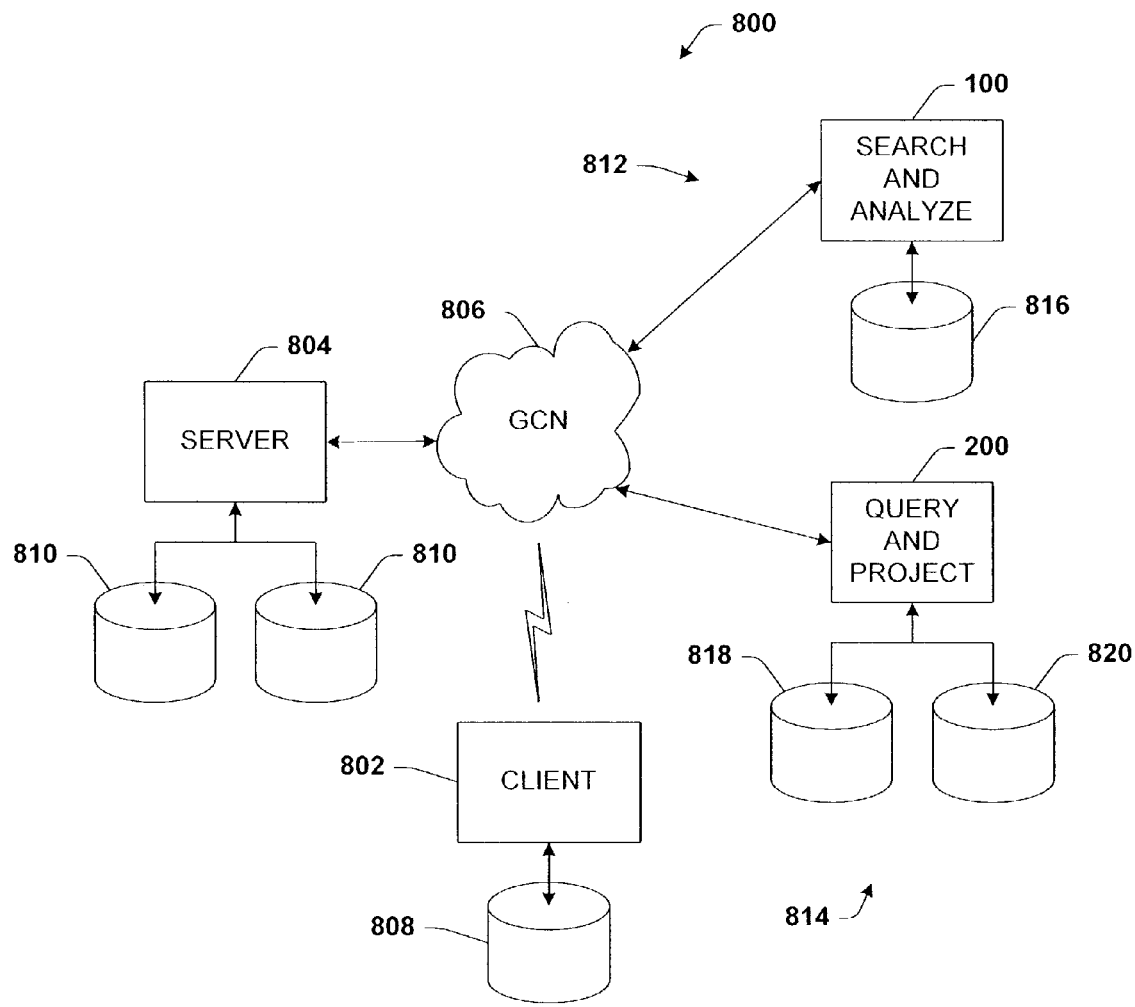
FIG. 8 illustrates a block diagram of a computing environment that utilizes the functionality of the systems of FIG. 1 and FIG. 2 of the present invention.

Referring now to FIG. 8, there is illustrated a block diagram of a computing environment 800 that utilizes the functionality of the systems of FIG. 1 and FIG. 2 of the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example.

The system 800 also includes one or more server(s) 804. The server(s) 804 can also be hardware and/or software (e.g., threads, processes, computing devices). The servers 804 can house threads to perform transformations by employing the present invention, for example. One possible communication between the client 802 and the server 804 may be in the form of a data packet adapted to be transmitted between two or more computer processes. The data packet may include a cookie and/or associated contextual information, for example.

The system 800 includes a communication framework 806 (e.g., a global communication network (GCN) such as the Internet) that may be employed to facilitate communications between the client(s) 802, the server(s) 804, and all wired and wireless portable and mobile devices suitably configured for communication thereacross. Communications may be facilitated via a wired (including optical fiber) and/or wireless technology.

The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

A first node 812 of the illustrated network may include the search and analysis capability of FIG. 1, while a second node 814 may include the query and projection capability of FIG. 2. As indicated hereinabove, the capabilities may also be combined into a single system disposed as a single node on the network 800. The first node 812 has associated therewith a data store 816 for storing data, and includes the search and analyze components (102 and 106) for processing search requests, and analyzing the returned search documents (or data) according to the present invention. The second node 814 has associated therewith one or more data stores (818 and 820) for storing data, and includes the query and projection components (202 and 212) for processing query requests, and projecting the returned search documents (or data) according to the present invention.

The search of the first node 812 may be performed on the local data store 816 or on remote data stores, e.g., 808, 810, 818, and/or 820. Similarly, a query of the second node 814 may be performed on the local data stores (818 and 820) or on remote data stores, e g., 808, 810, and/or 816.

It is typical during a "web" search or query that the search process occurs via a single search (or query) engine across multiple data stores. The results are then returned via the search engine to the user's system for processing and review. However, the disclosed architecture is not limited to s single search engine, but may operate with multiple search engines. For example, the search component 102 (in FIG. 1) of the system 100 may operate in cooperation with the query component 202 of the system 200. Furthermore, a search engine of the client 802 may operate in cooperation with one or both of the search component 102 of the system 100 and the query component 202 of the system 200.

Where projection may be required from the search results of the system 200 to the system 100, the systems (100 and 200) may communicate search signals therebetween to facilitate the process. For example, signals may be communicated from system 100 to system 200 to initiate the projection process by system 200. System 200 may respond with a signal to system 100 when the higher redundancy processing is completed, and transmission of the projected data is to commence. These signals facilitate a handshaking regime and/or a synchronization regime such that the two systems (100 and 200) operate efficiently and transparently to the user. Of course, other signals may be communicated to ensure efficient processing.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that facilitates data retrieval, comprising:
    a query component that receives a query to a first dataset, and
    a projection component that executes the query across a second dataset, and analyzes properties of results of the query on the first dataset and results of the second dataset to generate a refined version of the query to run on the first dataset to facilitate responding to the query across the first dataset, the projection component analyzes the properties of the results by determining a similarity measure that is a cosine distance for each result.

2. The system of claim 1, the projection component executes the query across the second dataset in response to determining tat projection is required on the first dataset.

3. The system of claim 1, the projection component automatically executes the query across the second dataset substantially simultaneously with execution of the query across the first dataset.

4. The system of claim 1, the second dataset having higher redundancy than the first dataset.

5. The system of claim 1, the projection component analyzes the properties of the results by generating word probability distributions for each result.

6. The system of claim 1, the results of the first and second datasets returned in the form of documents.

7. The system of claim 1, the projection component determines a word probability distribution for one of the results.

8. The system of claim 1, the projection component evaluates the results of the second dataset for pairwise information redundancy with the results of the first dataset.

9. The system of claim 1, the query component ranks the results of the first dataset for output.

10. The system of claim 1, the query component reranks the results of the first dataset for output according to projection information received from the projection component.

11. The system of claim 1, the projection component generates the refined version of the query in accordance wit properties of a good answer document of the second dataset.

12. The system of claim 1, the projection component determines the average pairwise redundancy of the results of the second dataset with the results of the first dataset.

13. The system of claim 1, the projection component automatically determines the number of results of the second dataset query to use to generate the refined version of the query.

14. The system of claim 13, the number of results determined according to a classification scheme that classifies the results according to predetermined criteria.

15. The system of claim 13, the number of results determined according to a classification scheme that selects the results according to a redundancy value.

16. The system of claim 1, further comprising a classifier tat determines a number of results of the second dataset to be used for generating the refined version of the query.

17. The system of claim 16, the classifier is a support vector machine.

18. A computer readable medium having stored thereon the components of claim 1.

19. The system of claim 1, the properties of the results related to at least one of textual content, image content, and audio content.

20. A machine implemented system that facilitates data retrieval, comprising:
    a query component that receives a query to a first dataset; and
    a projection component that executes the query across a second dataset, and generates a result set that is employed in connection with the first dataset to facilitate responding to the query, the projection component analyzes the properties of the result set by determining a similarity measure that is a cosine distance for each result.

21. The system of claim 20, the projection component executes the query across the second dataset in response to determining that projection is required on the first dataset.

22. The system of claim 20, the projection component automatically executes the query across the second dataset substantially simultaneously with execution of the query across the first dataset.

23. The system of claim 20, the second dataset having higher redundancy than the first dataset.

24. The system of claim 20, the projection component generates a word probability distribution for at least one result of the result set.

25. The system of claim 20, the result set in the form of documents.

26. The system of claim 20, the result set generated from the query across the second dataset.

27. The system of claim 20, the projection component evaluates the result set for pairwise information redundancy with query results of the first dataset.

28. The system of claim 20, the query component ranks results of the first dataset for output.

29. The system of claim 20, the query component re-ranks results of the first dataset for output according to projection information received from the projection component.

30. The system of claim 20, the projection component generates a refined version of the query in accordance with properties of a good answer document of the second dataset.

31. The system of claim 20, the projection component determines the average pairwise redundancy of the result set of the second dataset with a result set of the first dataset.

32. The system of claim 20, the projection component automatically determines the number of results to use to generate the result set of the query.

33. The system of claim 32, the number of results determined according to a classification scheme that classifies the results according to predetermined criteria.

34. The system of claim 33, the number of results determined according to a classification scheme that selects the results according to a redundancy value.

35. The system of claim 20, further comprising a support vector machine that determines a number of results of the second dataset to be used for generating the refined version of the query.

36. A computer according to the system of claim 20.

37. A machine implemented system that facilitates data retrieval, comprising:
   a search component that executes a query and returns a dataset; and
   an analysis component that determines relevance of a subset of the returned dataset as a function of similarity properties thereof with respect to the entire returned dataset, the similarity properties determined according to a similarity measure that is a cosine distance measure.

38. The system of claim 37, the analysis component generates a word probability distribution for at least one result of the returned dataset.

39. The system of claim 37, the subset in the form of documents.

40. The system of claim 37, the analysis component evaluates the returned dataset for average pairwise information redundancy.

41. The system of claim 37, the search component reranks results of the query according to relevance of the subset as determined by an information redundancy value.

42. The system of claim 41, the information redundancy value determined by the analysis component as the average pairwise information redundancy between one result and the remaining results.

43. A computer according to the system of claim 37.

44. A machine implemented method of facilitating data retrieval, comprising:
   receiving a query for processing by a search engine against a first dataset;
   executing the query against the first dataset and a second dataset;
   analyzing properties of results of the first dataset query and of results of the second dataset query to determine a refined version of the query by determining a similarity measure that is a cosine distance for each result;
   transmitting the refined version of the query to the search engine; and
   reranking the results of the first dataset query according to the refined version of the query.

45. The method of claim 44, the second dataset remote from the first dataset.

46. The method of claim 44, hither comprising reapplying the refined version of the query against the first dataset in order to obtain the re-ranked results.

47. The method of claim 44, the first dataset having lower data redundancy than the second dataset.

48. The method of claim 44, the query executed against the first and second dataset substantially simultaneously.

49. The method of claim 44, the query executed against the second dataset only in response to the execution of the query against the first dataset returning a minimum number of results.

50. The method of claim 44, the results in the form of documents, the properties of which relate to at least one of textual content, image content, audio content and hyperlink content.

51. The method of claim 44, the documents are web pages returned from a website.

52. The method of claim 44, the properties analyzed by a projection component that is remotely disposed from the search engine, and in operative communication with the search engine.

53. The method of claim 44, the properties analyzed by:
   generating word probability distributions for each of the results; and
   determining an avenge pairwise information redundancy value of the results of the second dataset with the results of the first dataset using a similarity measure.

54. A machine implemented method of facilitating data retrieval, comprising:
   receiving a query for processing by a search engine against a first dataset;
   executing the query against the first dataset and a second dataset, the query against the second dataset used to characterize likely properties of a good answer to the query;
   generating a result set from the query of the second dataset by determining the average pairwise information redundancy between results of the first dataset query and the second dataset query, the average pairwise information redundancy is based at least upon a cosine distance measurement for each result;
   applying the result set in a subsequent query of the first dataset; and
   providing a ranked output according to the result set query.

55. The method of claim 54, the result set generated by:
   computing a word probability distribution for each result of the first dataset query and the second dataset query; and
   comparing the word probability distributions to determine a level of redundancy sufficient to improve the query of the first dataset.

56. The method of claim 54, further comprising classifying with a classification component the results of the second dataset query according to predetermined classification criteria.

57. The method of claim 56, further comprising training the classification component according to at least one of the number of results returned, the type and/or importance of query terms used in the query, time of the query, properties of the results included in the result set, and properties of results not included in the result set.

58. A machine implemented method of facilitating data retrieval, comprising:
   processing a query against a plurality of documents;
   measuring information redundancy of a returned document of a return set by determining an average pairwise information redundancy value between the returned document and the remaining documents of the return set, the average pairwise information redundancy is based at least upon a cosine distance measurement for each document; and
   providing a ranked output of documents according to corresponding pairwise information redundancy values.

59. The method of claim 58, further comprising selecting the documents associated with the higher average pairwise information redundancy values for the ranked output.

60. A machine implemented system that facilitates data retrieval, comprising:
   means for processing a query against a plurality of documents;
   means for measuring information redundancy of a returned document of a return set by determining an average pairwise information redundancy value between the returned document and the remaining documents of the return set, the average pairwise information redundancy is based at least upon a cosine distance measurement for each document; and means for providing a ranked output of documents according to corresponding pairwise information redundancy values.

61. A machine implemented system that facilitates data retrieval, comprising:

means for receiving a query for processing by a search engine against a first dataset;

means for executing the query against the first dataset and a second dataset, the query against the second dataset used to characterize likely properties of a good answer to the query;

means for generating a result set from the query of the second dataset by determining the average pairwise information redundancy between results of the first dataset query and the second dataset query, the average pairwise information redundancy is based at least upon a cosine distance measurement for each result;

means for applying the result set in a subsequent query of the first dataset; and means for providing a ranked output according to the result set query.

* * * * *

UNITED STATES PATENT AND TRADEMARK OFFICE
CERTIFICATE OF CORRECTION

PATENT NO.       : 7,051,014 B2                                                          Page 1 of 1
APPLICATION NO.  : 10/464081
DATED            : May 23, 2006
INVENTOR(S)      : Eric D. Brill et al.

It is certified that error appears in the above-identified patent and that said Letters Patent is hereby corrected as shown below:

On the Title page, Item (56), under "Other Publications", in column 2, line 12, delete "Rythmic" and insert -- Rhythmic --, therefor.

In column 1, line 64, after "which" delete "arc" and insert -- are --, therefor.

In column 14, line 40, delete "e g.," and insert -- e.g., --, therefor.

In column 15, line 17, in Claim 1, delete "dataset," and insert -- dataset; --, therefor.

In column 15, line 30, in Claim 2, delete "tat" and insert -- that --, therefor.

In column 15, line 56, in Claim 11, delete "wit" and insert -- with --, therefor.

In column 16, line 5, in Claim 16, delete "tat" and insert -- that --, therefor.

In column 17, line 44, in Claim 46, delete "hither" and insert -- further --, therefor.

In column 17, line 57, in Claim 50, after "content" insert -- , --.

In column 17, line 59, in Claim 51, after "Claim" delete "44" and insert -- 50 --, therefor.

In column 18, line 1, in Claim 53, delete "avenge" and insert -- average --, therefor.

Signed and Sealed this

Twenty-seventh Day of July, 2010

David J. Kappos
*Director of the United States Patent and Trademark Office*